United States Patent
Matsuyama et al.

(10) Patent No.: US 8,144,753 B2
(45) Date of Patent: Mar. 27, 2012

(54) DETECTION DEVICE OF A SPREADING CODE AND A TIMING, AND A METHOD THEREOF

(75) Inventors: Koji Matsuyama, Kawasaki (JP); Masahiko Shimizu, Kawasaki (JP); Takeshi Inoue, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 12/646,060

(22) Filed: Dec. 23, 2009

(65) Prior Publication Data

US 2010/0098137 A1 Apr. 22, 2010

Related U.S. Application Data

(63) Continuation of application No. 09/336,363, filed on Jun. 17, 1999, now abandoned.

(30) Foreign Application Priority Data

Oct. 5, 1998 (JP) .................................... 10-282258

(51) Int. Cl.
*H04B 1/707* (2011.01)
(52) U.S. Cl. ....................................................... 375/150
(58) Field of Classification Search .................. 375/140, 375/142, 143, 144, 148, 149, 150, 151
See application file for complete search history.

(56) References Cited

U.S. PATENT DOCUMENTS

| | | | |
|---|---|---|---|
| 5,673,260 A | 9/1997 | Umeda et al. | |
| 5,724,378 A | 3/1998 | Miki et al. | |
| 5,768,306 A | 6/1998 | Sawahashi et al. | |
| 5,781,584 A | 7/1998 | Zhou et al. | |
| 5,889,815 A | 3/1999 | Iwakiri | |
| 5,910,948 A | 6/1999 | Shou et al. | |
| 5,982,763 A | 11/1999 | Sato | |
| 6,038,250 A | 3/2000 | Shou et al. | |
| 6,167,037 A | 12/2000 | Higuchi et al. | |
| 6,188,682 B1 | 2/2001 | Takagi et al. | |

FOREIGN PATENT DOCUMENTS

| | | |
|---|---|---|
| JP | 63-73731 | 4/1988 |
| JP | 5-260437 | 10/1993 |
| JP | 6-77931 | 3/1994 |
| JP | 7-74724 | 3/1995 |
| JP | 7-131381 | 5/1995 |
| JP | 8-46546 | 2/1996 |
| JP | 9-46174 | 2/1997 |
| JP | 9-64846 | 3/1997 |
| JP | 9-247045 | 9/1997 |

(Continued)

OTHER PUBLICATIONS

Notification of Reason(s) for Refusal dated Aug. 10, 2004, from the corresponding Japanese Application.

(Continued)

*Primary Examiner* — Kevin Kim
(74) *Attorney, Agent, or Firm* — Katten Muchin Rosenman LLP

(57) ABSTRACT

An A/D converted and inputted signal is stored in a memory. A sliding correlator sequentially reads the signal stored in the memory and despreads this signal. A despreading timing is adjusted and then the candidate for a despreading code is outputted from a code generation circuit. The despreading code outputted at a predetermined timing is used for obtaining a correlation value of signals outputted from the memory, using the sliding correlator. Thus, by storing signals in the memory, fluctuation of a correlation value caused by fading does not occur while specifying a code or detecting a despreading timing.

1 Claim, 10 Drawing Sheets

FOREIGN PATENT DOCUMENTS

| | | |
|---|---|---|
| JP | 10-32523 | 2/1998 |
| JP | 10-126378 | 5/1998 |
| JP | 10-200447 | 7/1998 |
| JP | 11-68616 | 3/1999 |
| JP | 11-98112 | 4/1999 |
| JP | 2005-318655 | 11/2005 |
| WO | 95/07577 | 3/1995 |

OTHER PUBLICATIONS

K. Higuchi, et al. "Two-Stage Rapid Cell Search Scheme Employed in DS-CDMA Asynchronous Cellular System Using Long Codes" Technical Report of IEICE, RCS96-73, pp. 51-56, Aug. 9, 1996.

United States Office Action dated Jun. 5, 2002, from corresponding U.S. Appl. No. 09/336,363.

United States Office Action dated Jul. 2, 2003, from corresponding U.S. Appl. No. 09/336,363.

United States Office Action dated Nov. 14, 2005, from corresponding U.S. Appl. No. 09/336,363.

Notice of Rejection Grounds dated Nov. 2, 2004, from the corresponding Japanese Application.

Notice of Rejection Grounds dated May 10, 2005, from the corresponding Japanese Application.

Notice of Rejection Grounds dated Mar. 14, 2006, from the corresponding Japanese Application.

Notice of Rejection Grounds dated Nov. 14, 2006, from the corresponding Japanese Application.

Notice of Rejection Ground dated Sep. 29, 2009, from the corresponding Japanese Application.

United States Office Action dated Nov. 1, 2002, from corresponding U.S. Appl. No. 09/336,363.

United States Office Action dated Jan. 27, 2004, from corresponding U.S. Appl. No. 09/336,363.

Advisory Action dated May 11, 2004, from corresponding U.S. Appl. No. 09/336,363.

United States Office Action dated Jun. 23, 2004, from corresponding U.S. Appl. No. 09/336,363.

United States Office Action dated May 12, 2005, from corresponding U.S. Appl. No. 09/336,363.

United States Office Action dated Jul. 25, 2006, from corresponding U.S. Appl. No. 09/336,363.

Advisory Action dated Oct. 23, 2006, from corresponding U.S. Appl. No. 09/336,363.

United States Office Action dated Feb. 14, 2007, from corresponding U.S. Appl. No. 09/336,363.

United States Office Action dated Aug. 7, 2007, from corresponding U.S. Appl. No. 09/336,363.

Advisory Action dated Nov. 29, 2007, from corresponding U.S. Appl. No. 09/336,363.

Notice of Panel Decision from Pre-Appeal Brief Review dated Feb. 15, 2008, from corresponding U.S. Appl. No. 09/336,363.

Examiner's Answer dated Nov. 6, 2008, from corresponding U.S. Appl. No. 09/336,363.

United States Office Action dated Jun. 16, 2010, from corresponding U.S. Appl. No. 09/336,363.

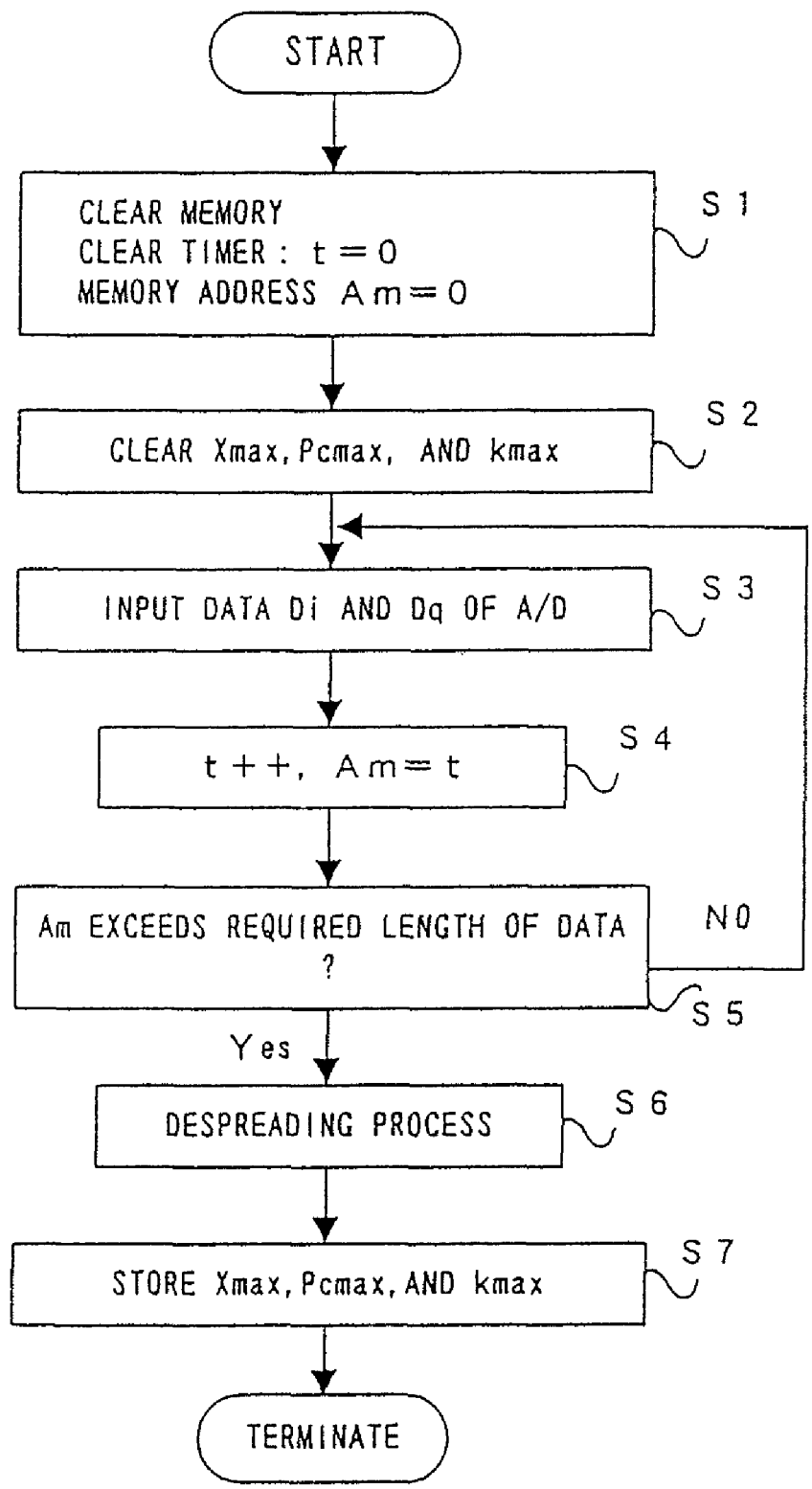
F I G. 5

DETECTION DEVICE OF A SPREADING CODE AND A TIMING, AND A METHOD THEREOF

BACKGROUND OF THE INVENTION

1. Field of the Invention

The present invention relates to a detection device of a despreading code and a despreading timing, and a method thereof in a spread spectrum communication system or in a CDMA communication system.

2. Description of the Related Art

In communication performed from a base station to a mobile station, when the base station is captured at the time of initial synchronization or hand-over, a despreading code and a despreading timing should be detected in an asynchronous CDMA method. Hand-over here means that a user having a mobile terminal moves from a base station to another base station. In this case, the mobile station (mobile terminal) is required to detect a despreading code and a despreading timing which the base station is using, in order to obtain the signals from each base station which is asynchronously transmitting signals. A channel for establishing synchronization, called a perch channel, is installed to perform the above signal detection. The spreading code of part of the perch channel or the spreading code of all the data symbols are common to each base station or has few candidates. Therefore, a perch channel can be captured using a predetermined despreading code. The following explanation is based on a system where the spreading code of part of the perch channel or the spreading code of all the data symbols is common to each base station or has few candidates. This is because if there are many kinds of the spreading code of a perch channel, an extended period of time is required to establish synchronization, making such a system impractical. However, since there are thought to be many methods of capturing a perch channel, it is not always necessary for the spreading code of the perch channel to be the same as that of each base station or for a few candidates to be provided. Therefore, the above-mentioned case will not influence the configuration of the present invention described below.

The following are the procedures for establishing synchronization in the case where the spreading code of part of a perch channel or the spreading code of all the data symbols is common to each base station, or where a few candidates are provided.

1. In the case where the spreading code of a perch channel is common to each base station, a despreading timing can be detected by detecting the correlation value of part of common codes using a matched filter or the like, and by detecting a timing at which the maximum correlation value is obtained as a synchronizing timing.

2. In the case where the spreading code of a perch channel has several candidates, the spreading code and the spreading timing where the maximum correlation value is obtained, can be detected as a synchronizing timing by performing the operations in item 1 for all spreading codes that are candidates. In spread spectrum communication including CDMA communication, a spreading code is the same as a despreading code with regard to a code.

3. In the case where part of the spreading codes of a perch channel is common to each base station, first, a despreading timing is captured by the code common to each base station. Next, a code which is not common to each base station is despread by the spreading code of several candidates, and thus the code which is not common to each base station can be detected.

In the case where the spreading code inherent to a base station has several candidates when the code inherent to a base station is captured after processing the procedures in items 1, 2, and 3, this procedure can be treated as being the same as that described in item 2. When spreading codes of several candidates are correlated, a despreading process is repeated for each of the candidates.

A process in the case where the spreading code of a perch channel has several candidates is equal to a process in the case where the inherent base station code has several candidates. Therefore, the following is the explanation of a configuration of detecting the spreading inherent base station code. In this case, and different from the case of a perch channel, a spreading code is different for each base station, and the number of the candidates is not limited to only a few.

If it takes a long time to repeat a despreading process the number of times equal to the number of candidates when initial synchronization and clock synchronization are not obtained, a timing gradually lags because of the deflection of a local oscillator for clock timings of a base station and a mobile station. Accordingly, there is the possibility that the right correlation value of codes of all candidates cannot be obtained. Further, there is the possibility that electric power being received will change due to the effects of fading while a process is being performed, and thus correlation values cannot be properly compared.

A conventional configuration shown in FIG. 1 has been proposed as a means for solving this problem.

First, in order to obtain a synchronizing timing using a perch channel, a received signal is converted into a digital signal by an A/D converter 1000. The following explanation is based on the fact that the process of a received signal is a digital process. However, the process is not always required to be a digital process, and a configuration of an analog process can be adopted. Received I-phase and Q-phase signals are transmitted to a matched filter 1001 and sliding correlators 1005-1 to 1005-3, respectively. "I+jQ" shown in FIG. 1 is the abbreviation of a configuration of processing the I-phase and Q-phase signals. Since a carrier of the I-phase signal and a carrier of the Q-phase signal are shifted in phase by 90 degrees, a system can be easily understood by describing the I-phase signal and the Q-phase signal as a complex number such as "I+jQ".

Regarding the matched filter 1001, a filter for the I-phase signal and a filter for the Q-phase signal are provided. However, for the above reason, it is described assuming that the signal of a complex number (complex signal) was processed by one matched filter 1001. By inputting a code designation signal transmitted from a timing code storage circuit 1011 to the matched filter 1001, a despreading code is inputted to the matched filter 1001 from a code generation circuit 1012 to generate a despreading code. The matched filter 1001 obtains a correlation value by shifting a despreading timing, thereby inputting the correlation value to an electric power convertor 1002. The electric power convertor 1002 calculates the sum of the square of the correlation value of the I-phase signal and that of the Q-phase signal. When the totaled value downstream is calculated, this prevents the sum of the correlation values from being very small by rotating the phase of the I-phase signal or that of the Q-phase signal due to the effects of fading. If the sum of correlation values becomes very small, the sum of correlation values becomes small even if a despreading process is performed at the correct timing using the correct spreading code. Accordingly, it cannot be determined whether a despreading code and a timing are correct.

The correlation value with which the above-mentioned process has been performed in the electric power convertor 1002 is inputted to a totaling unit consisting of an adder 1003 and a memory 1004, and the correlation values for a plurality of symbols of an inputted signal are totaled. The correlation value which has been totaled for a plurality of symbols of an inputted signal is inputted to a switch 1009. In the case of detecting a perch channel, the totaled value of the correlation values obtained from a memory 1004 is inputted to a comparator 1010. The added value of correlation values obtained at each timing is inputted to the comparator 1010. The comparator 1010 determines whether the totaled value is greater than a predetermined value, and then outputs a signal. In the case where the spreading code of a perch channel is common to each base station, operations are performed only for obtaining a correct despreading timing. The timing code storage circuit 1011 determines, based on the output from the comparator 1010, whether the despreading code used for capturing a perch channel is correct or which timing is a correct despreading timing. In the case where the despreading code is not correct, the code generation circuit 1012 outputs another despreading code, and the matched filter 1001 repeats the detection of a synchronizing timing.

In the case where the spreading code of a perch channel is common to each base station, the timing code storage circuit 1011 compares the totaled values of the correlation values of each despreading timing which are outputted from the matched filter 1001, determines a correct despreading timing, and performs synchronous detection. In the case where a plurality of the spreading codes of a perch channel are present, the timing code storage circuit 1011 stores the totaled values of correlation values for the number of candidates for the spreading codes of a perch channel. In the case of the maximum totaled value, the timing code storage circuit 1011 determines that operations are performed using a correct despreading code at a correct despreading timing, and then performs synchronous detection.

The timing code storage circuit 1011 transmits a synchronizing signal, obtained by capturing a perch channel, to code generation circuits 1006-1 to 1006-3. At the same time, in order to detect the spreading code inherent in each base station, the timing code storage circuit 1011 outputs a code for use as a candidate for a despreading code to the code generation circuits 1006-1 to 1006-3 at the obtained synchronizing timing. Unlike the configuration of the matched filter 1001, sliding correlators 1005-1 to 1005-3 are configured to detect correlation values only at a predetermined timing. However, since the hardware of these correlators is much smaller than that of the matched filter 1001, these correlators are more advantageous than the matched filter 1001 with regard to the configuration of a circuit as well as with regard to electric power consumption. One example of the configuration of the sliding correlators 1005-1 to 1005-3 will be given later.

According to the configuration shown in FIG. 1, three code generation circuits 1006-1 to 1006-3 are provided. These circuits are configured to obtain correlation values obtained by a despreading process even at a timing that is slightly shifted so that it is before and after the synchronizing timing obtained by a timing code storage circuit 1011. This configuration takes into consideration the fact that a lag is gradually generated due to the deflection of the frequency of the clock of a base station and that of a mobile station, even if a synchronizing timing is obtained. According to this configuration, it is known that a despreading process can be effectively performed even if a lag between timings is generated.

The correlation values outputted from the sliding correlators 1005-1 to 1005-3 are converted into the sum of the square of the correlation value of the I-phase signal and that of the Q-phase signal in the electric power convertor 1007. An integration circuit 1008 adds the sums of the square of the I-phase signal and the square of the Q-phase signal for a plurality of symbols of the despreading code of an inputted signal to thereby be inputted to the switch 1009. When the spreading code inherent in each base station is detected, the switch 1009 is switched to output the signal transmitted from the integration circuit 1008 to the comparator 1010. The comparator 1010 determines whether the total value of the sums of the squared values is greater than a predetermined value, and transmits the results to the timing code storage circuit 1011. The timing code storage circuit 1011 determines that the despreading code corresponding to the maximum totaled value of correlation values is a spreading code used by a base station which will receive signals. After that, communication is performed using this despreading code.

According to the configuration shown in FIG. 1, a despreading process is performed by a plurality of correlators, in a range corresponding to the deflection of a local oscillator for a clock-timing. Then, a despreading process is performed before and after a timing is initially detected, and the maximum correlation value is selected. Although this method is effective for the lag between timings, it cannot remove the effects of fading.

SUMMARY OF INVENTION

The object of the present invention is to provide a device for removing a lag between timings and effects of fading, and for detecting a despreading code and a despreading timing necessary for communications.

The detection device of the present invention is characterized by comprising a storage unit for storing a transmitted signal in a demodulator of a direct sequence CDMA signal, a code generation unit for sequentially generating codes to be candidates for a despreading code, a correlation value obtaining unit for reading out the signal stored in the storage unit, to be despread by the code, and a detection unit for detecting the code used for the despreading process as a spreading code on a transmission side, in the case where the correlation value obtained by the correlation value obtaining unit is a maximum or greater than a reference value.

The detection method of the present invention is a detection method of a spreading code and a despreading timing in the demodulator for a direct sequence CDMA signal. This method is characterized by comprising the steps of (a) storing a transmitted signal, (b) sequentially generating a code to be candidates for a despreading code, (c) reading out the signal stored in step (a) to be despread by the code, and (d) detecting the code used for the despreading as a spreading code on a transmission side in the case where the correlation value obtained in step (c) is a maximum or greater than a reference value.

The detection device of a second aspect of the present invention is characterized by comprising a storage unit for storing a transmitted signal in a demodulator in spread spectrum communications, a code generation unit for sequentially generating candidate-codes for a despreading code, a correlation value obtaining unit for reading out the signal stored in the storage unit to be despread by shifting the phases of the codes, and a detection unit for detecting phases of the codes used for the despreading as a despreading timing, in the case where the correlation value obtained by the correlation value obtaining unit is a maximum or greater than a reference value.

According to the present invention, a received signal is stored once in a storage unit such as a memory and the like, the signal is read from the storage unit, and the correlation value is obtained. Therefore, when a received signal is directly despread, the present invention can prevent a correlation value from changing which occurs as the strength of a signal fluctuates due to the effects of fading and the like. Accordingly, a case in which the strength of a signal changes while obtaining a correlation value of a plurality of spreading codes, and the correlation value of a code which indicates that the original maximum correlation value becomes smaller than the correlation value of a code which indicate an original small correlation value, will not occur. That is, the present invention can accurately distinguish codes.

Similarly, when a despreding timing is detected, a correlation value is obtained using a signal stored in a memory, and a despreading timing at which a correlation value is a maximum or greater than a reference value, is obtained. Therefore, the effects of fading can be removed and a timing can be accurately detected.

BRIEF DESCRIPTION OF THE DRAWINGS

FIG. 5 is a flowchart (No. 1) showing the flow of processes according to the first embodiment of the present invention;

DESCRIPTION OF THE PREFERRED EMBODIMENT

Figure 1:
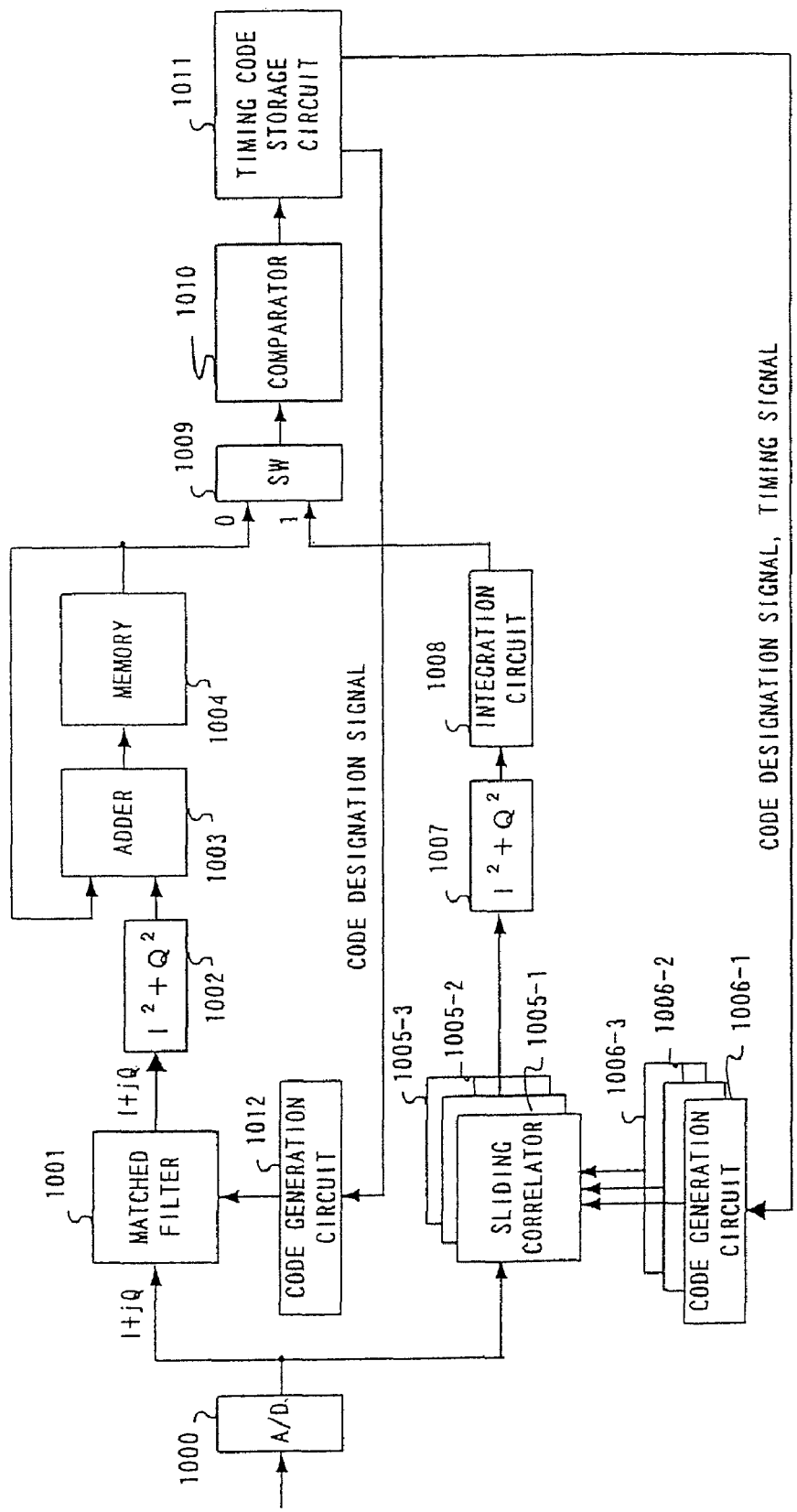
FIG. 1 is a block diagram showing the configuration of a conventional detection device for detecting a spreading code and a spreading timing.
Figure 2:
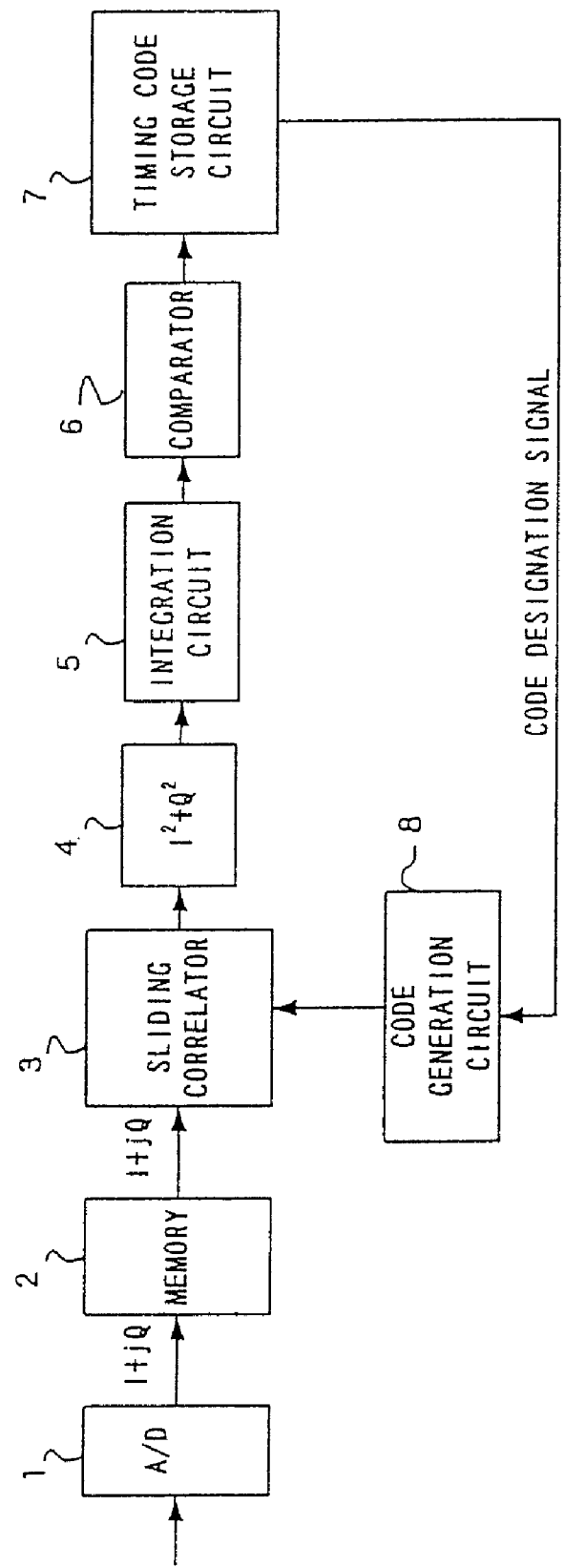
FIG. 2 is a block diagram showing a first embodiment of the present invention for processing a common code and the inherent base station code using a sliding correlator.

FIG. 2 is a block diagram showing the first embodiment of the present invention for processing a common code and the inherent base station code using a sliding correlator.

The first embodiment mainly consists of a code generation circuit 8, a sliding correlator 3, a memory 2, an integration circuit 5, a comparator 6, and a sliding code storage circuit 7. The following is an explanation of a configuration of processing a complex signal according to the above-mentioned method.

The following are the procedures for operation.
1. After the received complex signal of a perch channel is converted into a digital signal by an A/D converter 1, the value of voltage is stored in the memory 2. Data about the voltage are sequentially read from the memory 2 to be despread by the sliding correlator 3. At this time, the code generation circuit 8 generates a common spreading code sequentially by shifting timings. The electric power convertor 4 generates an absolute value of a squared complex signal. In order to reduce the effects of noise, the integration circuit 5 adds the sums of squared complex signals for a plurality of symbols, thereby calculating average substantially. The comparator 6 sets "m" timings as a despreading timing from the maximum or a greater value and these timings are stored in the timing code storage circuit 7.

2. For a complex number signal spread by the spreading code inherent in each base station, a correlation value is detected based on a code to sequentially become a candidate, using a sliding correlator 3 at "m" timings. At this time, the code generation circuit 8 generates "k" candidates for the spreading inherent base station code.

3. The comparator 6 detects n spreading codes in the order of greater correlation outputs. The timing code storage circuit 7 stores the timing, the codes, and the correlation value. The detection of a despreading code and a despreading timing terminate, while setting a timing and a code at which the maximum value obtained in item 3 can be obtained, as a despreading timing and the code of a base station. A process time can be reduced by simultaneously performing a despreading process at different timings using a plurality of sliding correlators.

That is, the voltage of an A/D converted inputted complex signal is stored in the memory 2. Using this stored inputted complex signal, the spreading inherent base station code is specified and a despreading timing is detected. The despreading timing measures a time when the inputted complex signal is stored in the memory 2 using a clock that is not drawn in the figures, and obtains a timing at which a transmitted signal is despread, establishing a cycle of a period of time while the spreading inherent base station code repeats itself. That is, the difference between a timing at which a complex signal is read from the memory 2 and a timing at which the code generation circuit 8 outputs a despreading code is stored, and the difference of a timing at which the correlation value becomes high is specified. By considering this difference together with a timing at which the inputted complex signal is stored in the memory 2, this timing is set to be a synchronizing timing for signals to be transmitted. Further, the spreading inherent base station code is specified as follows: First, the code generation circuit 8 sequentially outputs candidate-despreading codes and the code having a greater correlation value is set as the spreading inherent base station code. This spreading code is used for a despreading process in the following communications.

The reason why the code generation circuit 8 changes a timing of outputting a despreading code is that the sliding correlator 3 can detect a correlation value but it can only obtain a correlation value at a specific timing since it does not have a configuration to detect a timing. Therefore, correlation values can be obtained at various timings by changing a timing of inputting a despreading code to the sliding correlator 3. The electric power convertor 4 is provided for a reason similar to that mentioned above.

Thus, the effects of fading can be removed by storing a signal to be used for the specification of a spreading code and the specification of a despreading timing, and by using the signal stored in the memory 2 until a process terminates for all the timings and candidates. That is, while receiving a signal that is repeatedly transmitted, a timing is detected and a code is specified for the received signal, and then fading is generated as a mobile station moves and the strength of the signal changes. Therefore, the correlation value obtained by multiplying the signal with a despreading code changes due to the change in strength of the signal. Accordingly, in a case where the strength of a signal is small when a correlation value is obtained upon performing a despreading process at a synchronized timing, this correlation value might be smaller than the correlation value obtained at a timing that is not synchronized. Therefore, a change in a correlation value makes it impossible to accurately detect a synchronizing timing. This is true for the case of detecting the spreading inherent base station code. Accordingly, a correlation value in the case where a correct despreading code is used might become smaller than a correlation value in the case where an incorrect despreading code is used.

However, if a signal stored in the memory 2 is used, the strength of a signal for a despreading process does not change during the detection of a timing or the specification of a code, so that the above-mentioned problem will not occur. That is, the effects of fading can be completely removed.

Figure 3:
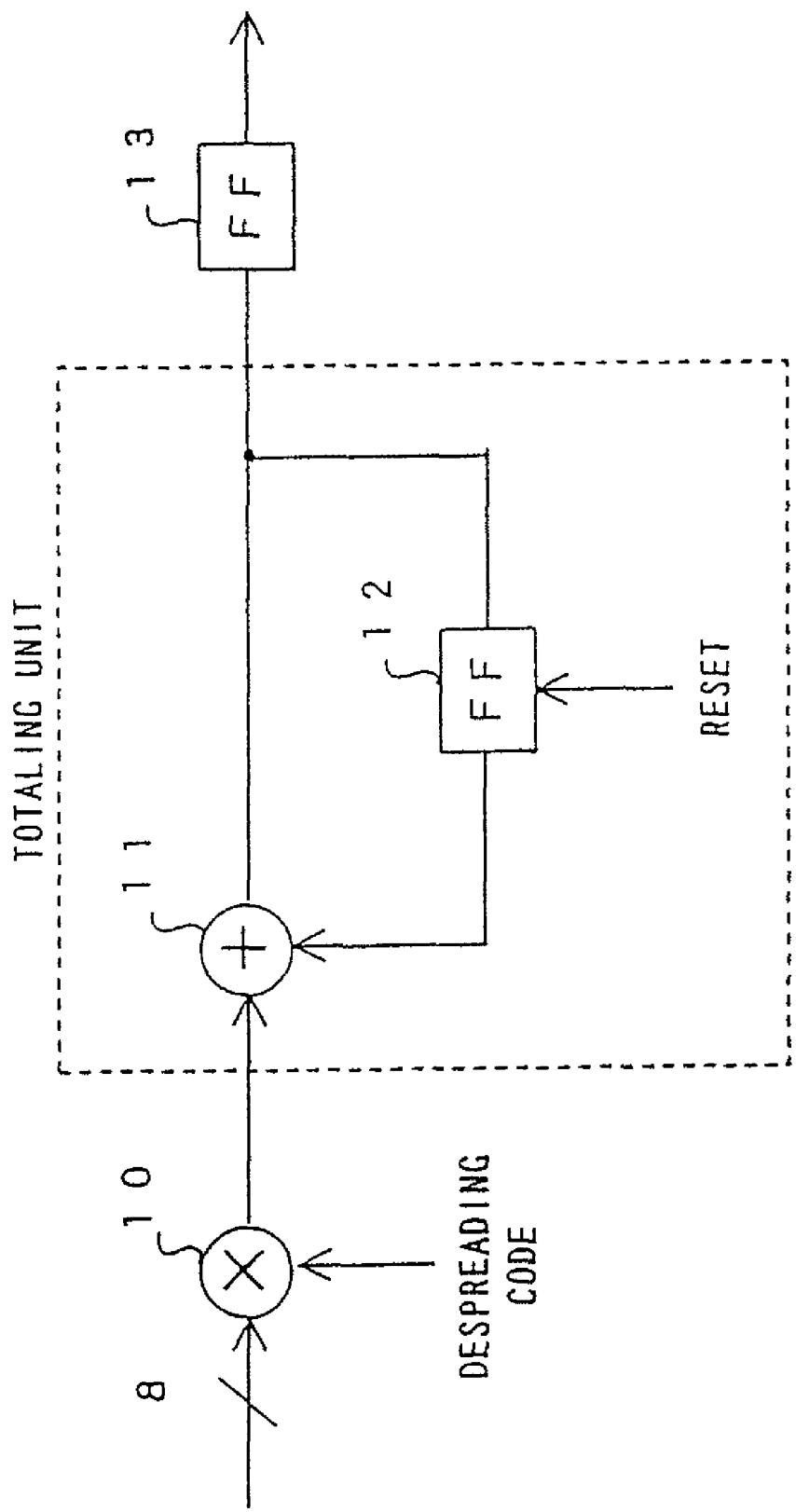
FIG. 3 is a block diagram showing an example of the configuration of the sliding correlator.

FIG. 3 is a block diagram showing one example of the configuration of a sliding correlator.

The sliding correlator consists of a multiplier 10 for multiplying an inputted signal with a depsreading code for each chip, a totaling unit configured by an adder 11 and the flip-flop circuit 12, and the flip-flop circuit 13 for storing the results of the addition. The operations performed when an inputted signal is an analog signal are the same as those when an inputted signal is a digital signal, but here it is assumed that a digital signal of 8 bits is used. The multiplier 10 is an exclusive OR circuit (EX-OR), for example, and it multiplies the inputted signal with a despreading code, thereby performing a despreading process. At this time, the despreading code is inputted to the multiplier 10 at a predetermined timing. This predetermined timing becomes a despreading timing. A signal despread in the multiplier 10 is inputted to the totaling unit. First, a signal passes through the adder 11 to be inputted to the flip-flop circuit 12 via a feedback path. The value of the flip-flop circuit 12 is inputted to the adder 11 and added with the despread value for one chip of the inputted despreading code which is delayed for one chip of the despreading code. When this process is performed for one symbol of the inputted signal and the totaled value is obtained, a reset signal is inputted to the flip-flop circuit 12. Further, the totaled value is stored in the flip-flop circuit 14 for output.

Thus, different from a matched filter, the sliding correlator detects a correlation value only for the despreading code inputted at a certain timing, and outputs the detected correlation value.

Figure 4:
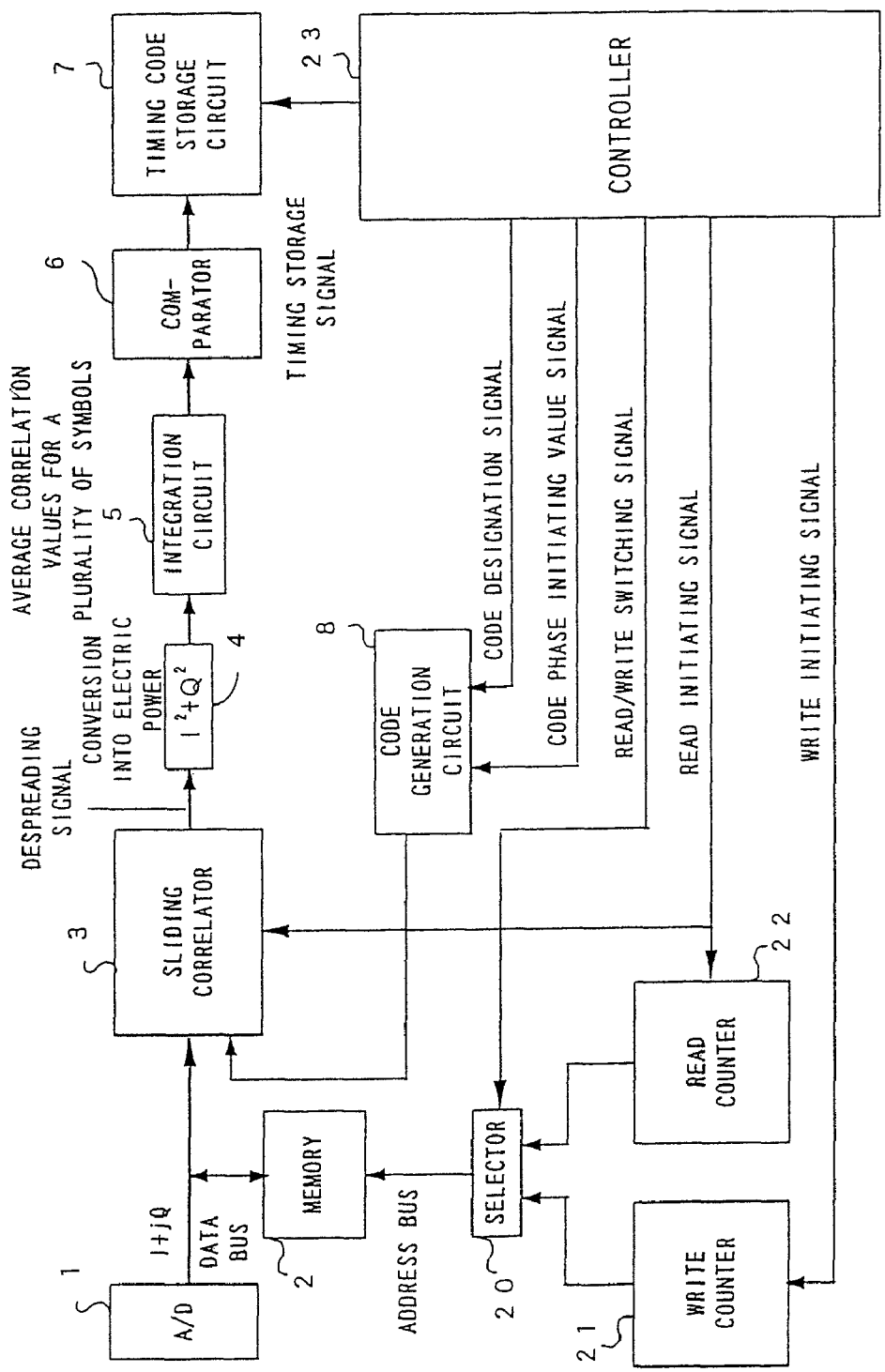
FIG. 4 is a block diagram showing the configuration of performing memory access operations according to the first embodiment of the present invention.

FIG. 4 is a block diagram showing the configuration of performing memory access operations according to the first embodiment of the present invention.

In FIG. 4, the same numerals as those shown in FIG. 2 indicate the same constituent elements.

In addition to the configuration shown in FIG. 2, a controller 23 for storing an inputted signal in the memory 2, and for performing a read-out process of the signal from the memory 2, is provided. The controller 23 inputs to a selector 20 for switching instructions of either a read-out process or a write process, a read-out/write switching signal indicating which is to be performed.

In the case, where an inputted signal is stored in the memory 2, the controller 23 inputs a write initiating signal to a write counter (for counting addresses) 21, and outputs the first address to be written. At this time, the selector 20 selects an input port from the write counter 21, and the address obtained from the write counter 21 is inputted to the memory 2. Then, the memory 21 enters a write condition, and the inputted signal from the A/D converter 1 is inputted to the memory 2.

When a signal is stored in the memory 2, a read-out initiating signal is inputted to the read-out counter 22 and the sliding correlator 3, and at the same time a read-out/write switching signal is inputted to the selector 20. The read-out counter 22 outputs a read-out address transmitted from the memory 2, which is to be inputted to the memory 2 via the selector 20. Then, a stored signal is read from the memory 2, which is to be inputted to the sliding correlator 3. At this time, the controller 23 outputs a code designation signal indicating which despreading code should be outputted or a code phase initiating value signal indicating at which timing the despreading code is outputted to the code generation circuit 8. The code generation circuit 8 generates a code based on the instructions from the code designation signal and the code phase initiating value signal to be inputted to the sliding correlator 3. A read-out initiating signal transmitted from the controller 23 is inputted to the sliding correlator 3 to reset the sliding correlator 3 for the detection of a new correlation value. For example, this reset is performed to reset the flip-flop circuits 12 and 13 at the same time. Further, the controller 23 obtains a despreading timing from the value of the code phase initiating value signal inputted to the code generation circuit 8, to thereby be outputted to the timing code storage circuit as a timing storage signal.

Figure 6:
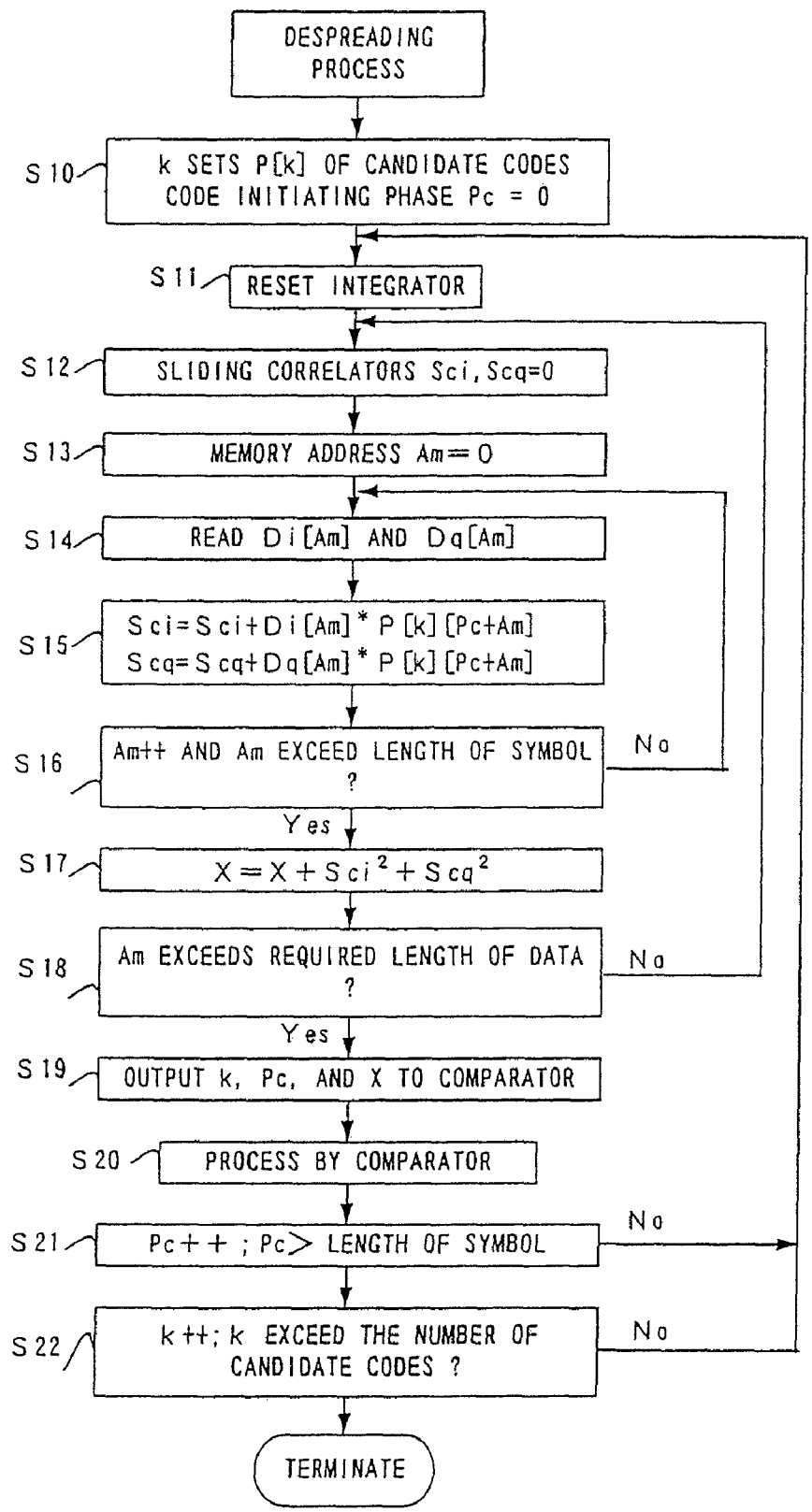
FIG. 6 is a flowchart (No. 2) showing the flow of processes according to the first embodiment of the present invention.
Figure 7:
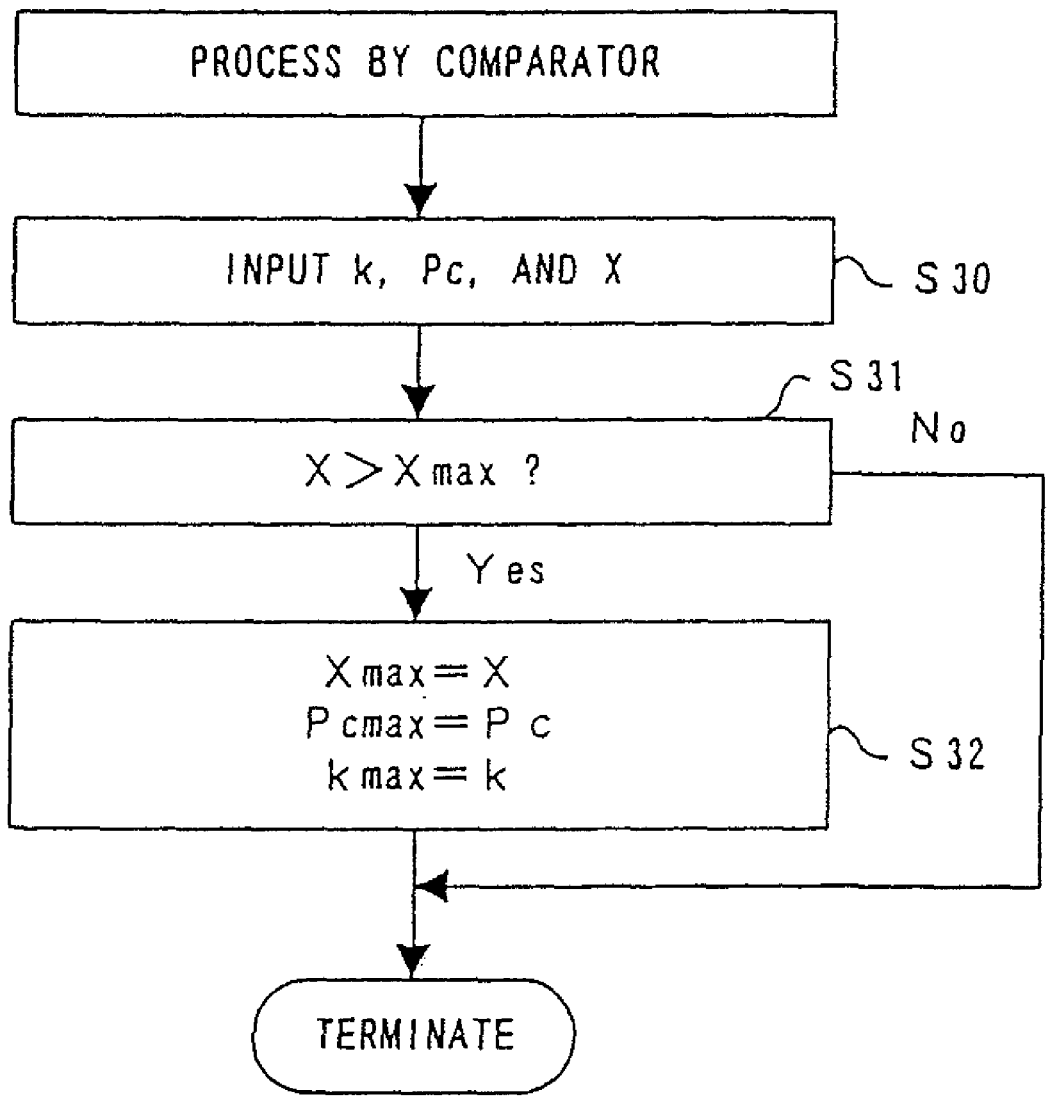
FIG. 7 is a flowchart (No. 3) showing the flow of processes according to the first embodiment of the present invention.

FIGS. 5 to 7 are flowcharts showing the flow of the processes according to the first embodiment of the present invention.

FIG. 5 is a flowchart showing the flow of a whole process.

At step S1, in order to start a process, a memory, a timer, and a memory address are respectively cleared. At step S2, a maximum value Xmax of the totaled values of correlation values, the phase Pcmax of a despreading code in the case where the totaled value is a maximum, a number Kmax specifying one of the despreading codes to be used as candidates, which indicates the maximum totaled value, are all cleared. At step S3, an I-phase signal value Di and a Q-phase signal value Dq which have been converted into digital signals by the A/D converter, are stored in a memory. At step S4, a memory address Am, set as the value of a timer, is incremented. At step S5, it is determined whether the number of inputted addresses to which signals are inputted exceeds the required length of data. Here, Am generally represents the address of a memory, but according to the diagram shown in FIG. 5, the addresses are sequentially numbered, starting from the head of the inputted signals. Further, the inputted signal is stored in one address for each chip of the despreading code. In the case where it has been determined at step S5 that signals are not stored for the required length of data, the flow returns to step S3, and additional signals are stored. When it is determined at step S5 that signals are stored in a memory for the required length of data, the flow advances to step S6. At step S6, a despreading process is performed. At step S7, the maximum correlation value Xmax, the phase Pcmax of a corresponding code, and a number Kmax specifying the code are stored and the process terminates.

FIG. 6 is a flowchart of the despreading process shown in FIG. 5.

First, at step S10, a candidate-code P[k] for a despreading process, and the initial phase Pc=c of the code are set. Here, P[k] represents a code specified by k. At step S11, an integration circuit is reset, and at step S12, a correlation value Sci of I-phase and a correlation value Scq of Q-phase of the sliding correlator are reset to "0". At step S13, the memory address Am is also reset to "0".

Next, at step S14, a signal value Di[Am] of I-phase and a signal value Dq[Am] of Q-phase, which are stored in a location indicated by the address Am of a memory, are read from the memory. At step S15, a despreading process is performed. That is, signal values Di[Am] and Dq[Am] of the Am-th chip, starting from the head of addresses or inputted data, are multiplied with a value P[k][Pc+Am] of the Pc+Am-th chip of a code P[k] which is specified by k. At step S16, After Am is incremented, it is determined whether Am exceeds the length of a symbol. At step S16, in the case where Am does not exceed the length of a symbol, the flow returns to step S14 and a value of the next signal is read to be despread at step S15. At the same time, the despread values are totaled. In the case where Am exceeds the length of a symbol at step S16, it is determined that a despreading process terminates for one symbol at step S15. Therefore, at step S17, a process of converting into electric power ($Sci^2+Scq^2$) is performed for suppressing the effects of the rotation of the phase between the I-phase and the Q-phase. At step S18, it is determined that Am exceeds the required length of data, and in the case where Am does not exceed the required length of data, the flow returns to step S12 and a despreading process of the next symbol is performed.

In the case where Am exceeds the required length of data at step S18, the values which are converted into electric power for the symbols included in the required length of data are totaled at step S17. Accordingly, this totaled value X, the phase Pc of the code at which the totaled value X is obtained, and a number k specifying the code are outputted to a comparator (step S19). The comparator performs a comparison process shown at step S20. At step S21, the phase value Pc of a code (currently, sequentially numbered starting from the head of a symbol) is incremented, and it is determined whether Pc exceeds the length of a symbol. In the case where Pc does not exceed the length of a symbol, it is determined that all the phases are not processed, and the flow returns to step S11 to repeat the process. In the case where Pc is determined to exceed the length of a symbol at step S21, a process is performed for all the phases. Therefore, at step S22, the number k specifying a code is incremented, and it is determined whether the value k exceeds the number of candidate-codes, that is, a process terminates all the candidates for the codes. In the case where k does not exceed the number of candidate-codes, it is determined that a process does not terminate for all the codes. Accordingly, the flow returns to step S11 to repeat the process. In the case where k exceeds the number of codes, the process terminates.

FIG. 7 is a flowchart of the comparison process shown in FIG. 6.

At step S30, the number k specifying a code, the phase Pc of a despreading code and the totaled value X which are outputted at step S19 shown in FIG. 6, are inputted. It is determined at step S31 whether the totaled value which is obtained by a current process is greater than the maximum value Xmax of the totaled value, which is currently established. In the case where the currently totaled value is equal to or smaller than the maximum value Xmax, the process terminates. In the case where the currently totaled value is greater than the maximum value Xmax, the current X, Pc, and k are set to Xmax, Pcmax, and kmax, and the process terminates.

From the process shown in FIGS. 5 to 7, a code at which the totaled value of correlation values is a maximum and a phase at the time of multiplying a despreading code can be obtained.

According to the above explanation, the sampling rate of an inputted signal is a chip rate, and an over-sampling is not performed. Actually, since a fluctuation exists at the inputted signal level, the inputted signal is over-sampled at a rate greater than the chip rate, using the highest level value in one chip. In this case, it is necessary to change the phase for multiply a despreading code in units of sampling rates, and also to change a method of designating the read-out address of a signal value or the chip of a despreading code, in the case of performing a despreading process. This process can be easily understood by a person having ordinary skill in the art.

Figure 8:
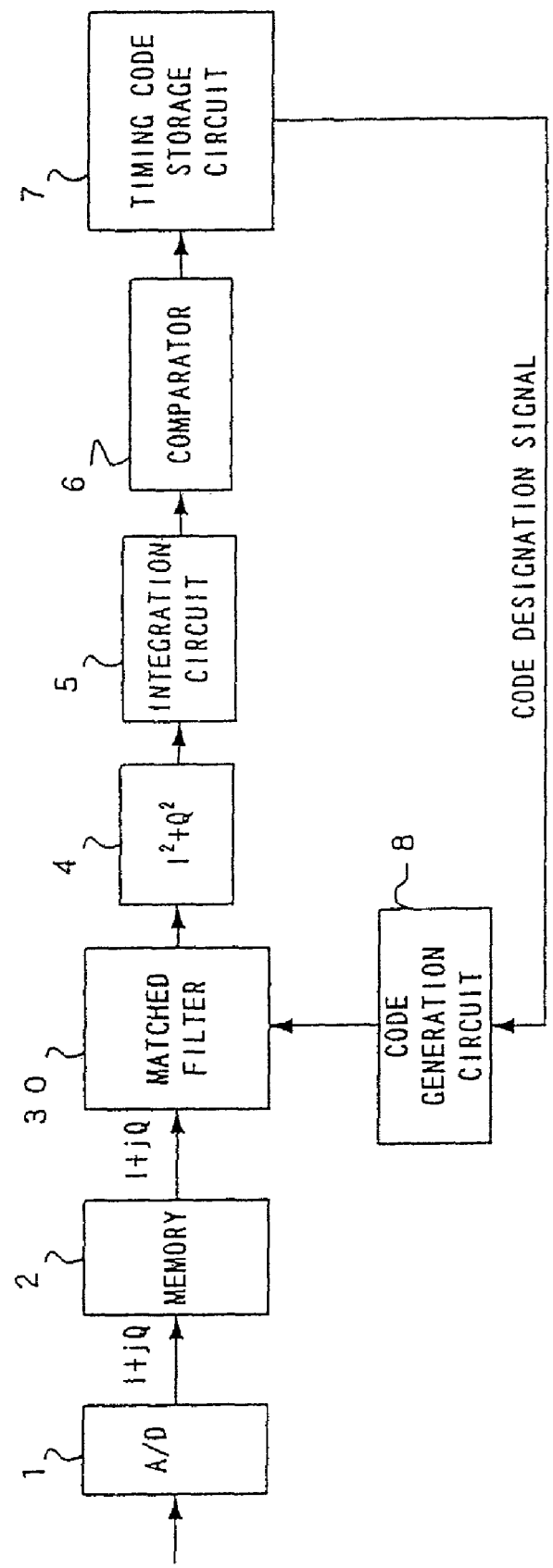
FIG. 8 is a block diagram showing a second embodiment of the present invention for processing a common code and the inherent base station code using a matched filter.

FIG. 8 is a block diagram showing a second embodiment of the present invention for processing a common code and an inherent base station code using a matched filter.

In FIG. 8, the same numerals as those shown in 2 indicate the same constituent elements.

The second embodiment mainly consists of the code generation circuit 8, a matched filter 30, the memory 2, the integration circuit 5, the comparator 6, and the timing code storage circuit 7.

The followings are the procedures for operation.

1. After the received complex signal of a perch channel is converted into a digital signal by the A/D converter 1, the value of the voltage is stored in the memory 2. Data about voltage are sequentially read from the memory 2 to be despread by the sliding correlator 3. The electric power convertor 4 converts the results obtained by despreading the I-phase and Q-phase signals into electric power. In order to reduce the effects of noise, the integration circuit 5 totals correlation values for a plurality of symbols and the sums are averaged. As despreading timings, the comparator 6 sets m timings selected in the order of the maximum or greater correlation values, or m timings greater than a reference value. Then, these m timings are stored in the timing code storage circuit 7.

2. The correlation value of the complex signals which are despread by an inherent base station despreading code is detected by a code to be a sequential candidate using a matched filter at m timings detected in item 1 above. At this time, the code generation circuit 8 generates k candidates of the inherent base station spreading code.

3. The comparator 6 detects n spreading codes in the order of greater correlation outputs. The timing code storage circuit 7 stores the timing, code, and correlation value.

The timing and code at which the maximum correlation value obtained in item 3 can be obtained are set as a despreading timing and the inherent base station code, respectively, and then the detection of a despreading code and a despreading timing terminates. Further, a process time can be reduced by simultaneously processing a plurality of despreading codes using a plurality of matched filters 30.

That is, the A/D converted inputted signal is stored in the memory 2. A read-out signal is inputted from a controller, which is not drawn in the figures, to the memory 2, and the stored signal is outputted. The code generation circuit 8 transmits a despreading code to the matched filter 30 based on the instructions from the timing code storage circuit 7. At this time, the matched filter 30 obtains a correlation value. The matched filter 30 outputs the correlation value based on a built-in clock, shifting the timing of multiplying a despreading code with a received signal, and therefore the timing of a despreading code with a received signal can be obtained from the timing at which the maximum correlation value is obtained. The code generation circuit 8 is not required to adjust the phases of codes and also is not required to output the adjusted code, which differs from the first embodiment of the present invention.

The correlation values obtained by the matched filter 30 are converted into electric power by the electric power convertor 4 to be totaled by the integration circuit 5. Then, the comparator 6 determines whether the totaled value is greater than a predetermined value, and transmits the code and the despreading timing to the timing code storage circuit 7 if they are determined correct. The timing code storage circuit 7 instructs the code generation circuit 8 to sequentially output different despreading codes, and causes the matched filter 30 to sequentially perform a despreading process with a candidate despreading code. Then, a code and a timing at which the maximum correlation value is obtained or a plurality of codes and timings at which the correlation values greater than a predetermined value are obtained, are stored in the timing code storage circuit 7.

In the present embodiment, since a matched filter is used, the hardware of the correlator becomes large. However, there are advantages such as that a phase does not need to be controlled when a code is outputted from the code generation circuit 8, and the despreading timing indicating the maximum correlation value can be obtained at the same time.

When a period of time required for the detection of a timing is greatly different from that for the determination of a code in the case of using a sliding correlator, it is possible that the capacity of a memory required for the detection of a timing is greatly different from that for the determination of a code. However, in the case of using a matched filter, the capacity of a memory can be reduced by determining a timing by electric power, detecting momentary electric power by the matched filter, and integrating the electric power in the occurrence cycle of a common code.

Figure 9:
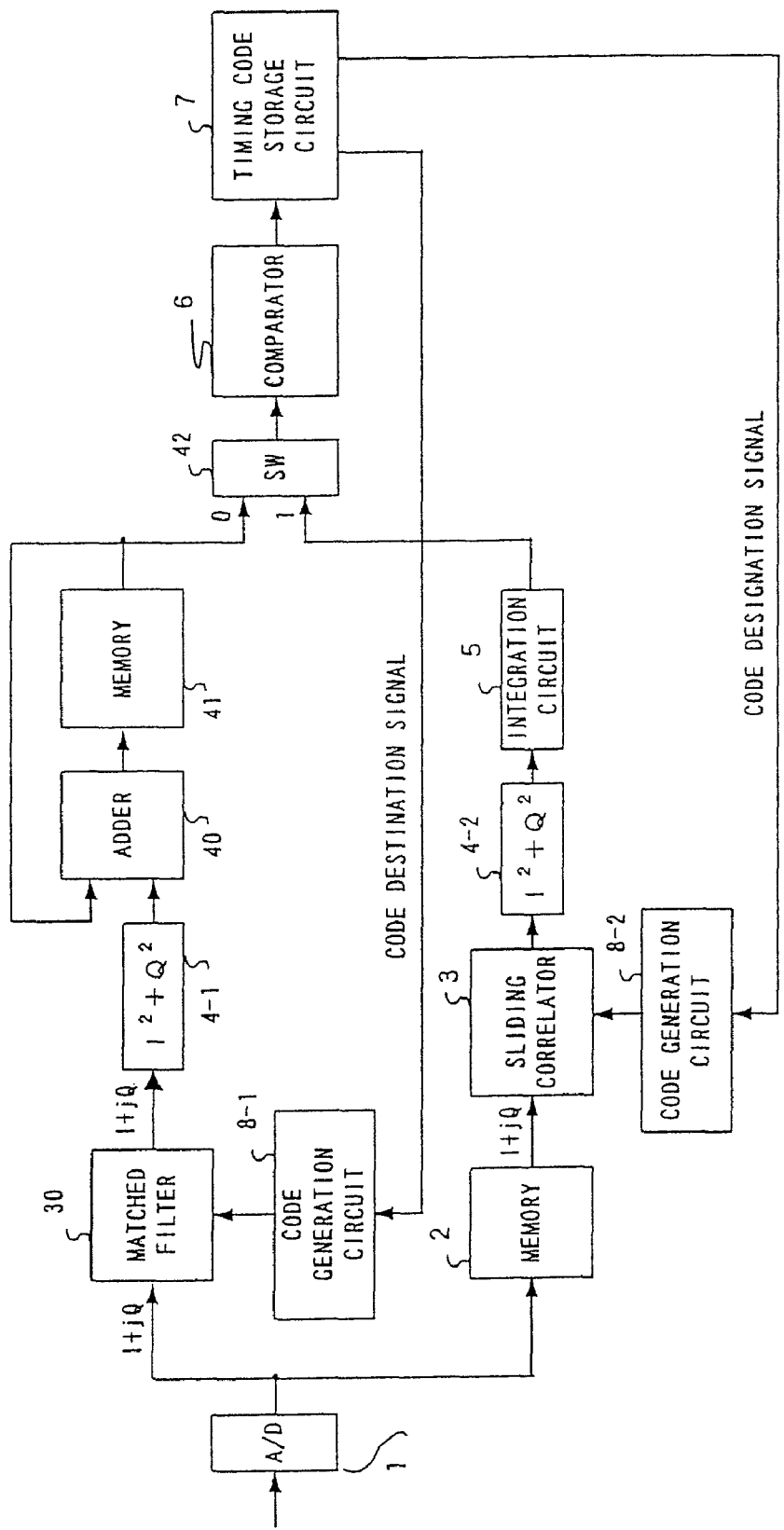
FIG. 9 is a block diagram showing a third embodiment of the present invention in the case where a despreading timing is detected using a common code by a matched filter and the inherent base station code by the present method.

FIG. 9 is a block diagram showing a third embodiment of the present invention in the case where a despreading timing is detected by processing a common code via a matched filter and by processing an inherent base station code via the present method.

In FIG. 9, the same numerals as those shown in FIG. 2 indicate the same constituent elements.

The third embodiment mainly consists of the code generation circuits 8-1 and 8-2, the matched filter 30, the sliding correlator 3, the memory 2, a memory 41, the comparator 6, the switch 42, and the timing code storage circuit 7.

The following are the operating procedures.

1. When a perch channel is detected, the switch 42 selects an input 0. For the received complex signal, a common despreading code is detected by a matched filter. The I-phase and Q-phase signals are converted into electric power by the electric power convertor 4-1. In order to reduce the effects of noise, the memory 41 and the adder 40 are used as an integrator to average the values of signals at the same timing. This averaged value is stored in the memory 41. After the values are averaged by the totaling, the data of the electric power are sequentially read from the memory 41. As despreading timings, the comparator 42 sets m timings selected in the order of the maximum or greater correlation values, or m timings greater than a reference value. Then, these m timings are stored in the timing code storage circuit 7.

2. When an inherent base station code is detected, the switch 42 selects an input 1. The voltage value of a received complex signal is stored in the memory 2. After the value is stored in the memory 2, the correlation value of the m timings detected in item 1 is detected by the sliding correlator 3 using the codes as sequential candidates.

3. The comparator 3 detects n spreading codes in the order of greater correlation outputs. The timing, code, and correlation value are stored in the timing code storage circuit 7.

The timing and code at which the maximum correlation value obtained in item 3 can be obtained are set as a despreading timing and an inherent base station code, respectively, and then the detection of a despreading code and a despreading timing terminates.

When a perch channel is detected, a signal representing a code of the perch channel is repeatedly transmitted in a predetermined cycle. In the case where the transmitted signal is repeatedly despread in a plurality of cycles in order to improve an S/N ratio of the signal, the signal is stored in the memory to be despread according to the first embodiment. Therefore, the number of signals to be stored in the memory 2 increases, and accordingly the size of the memory 2 becomes large. Therefore, the matched filter 30 is used only for the detection of a perch channel. Then, the correlation value and the timing are detected in real time to be stored in the timing code storage circuit 7. In the case where the inherent base station code is detected, a signal is stored in the memory 2, and the effects of fading are removed, thereby obtaining the correlation value and the timing. Consequently, the size of hardware can be minimized, an effective synchronizing timing can be obtained, and a code can be determined. Since the inherent base station code is continuously transmitted, the detection of S/N ratios can be effectively performed when the code is continuously processed by the sliding correlator 3 or the like.

Figure 10:
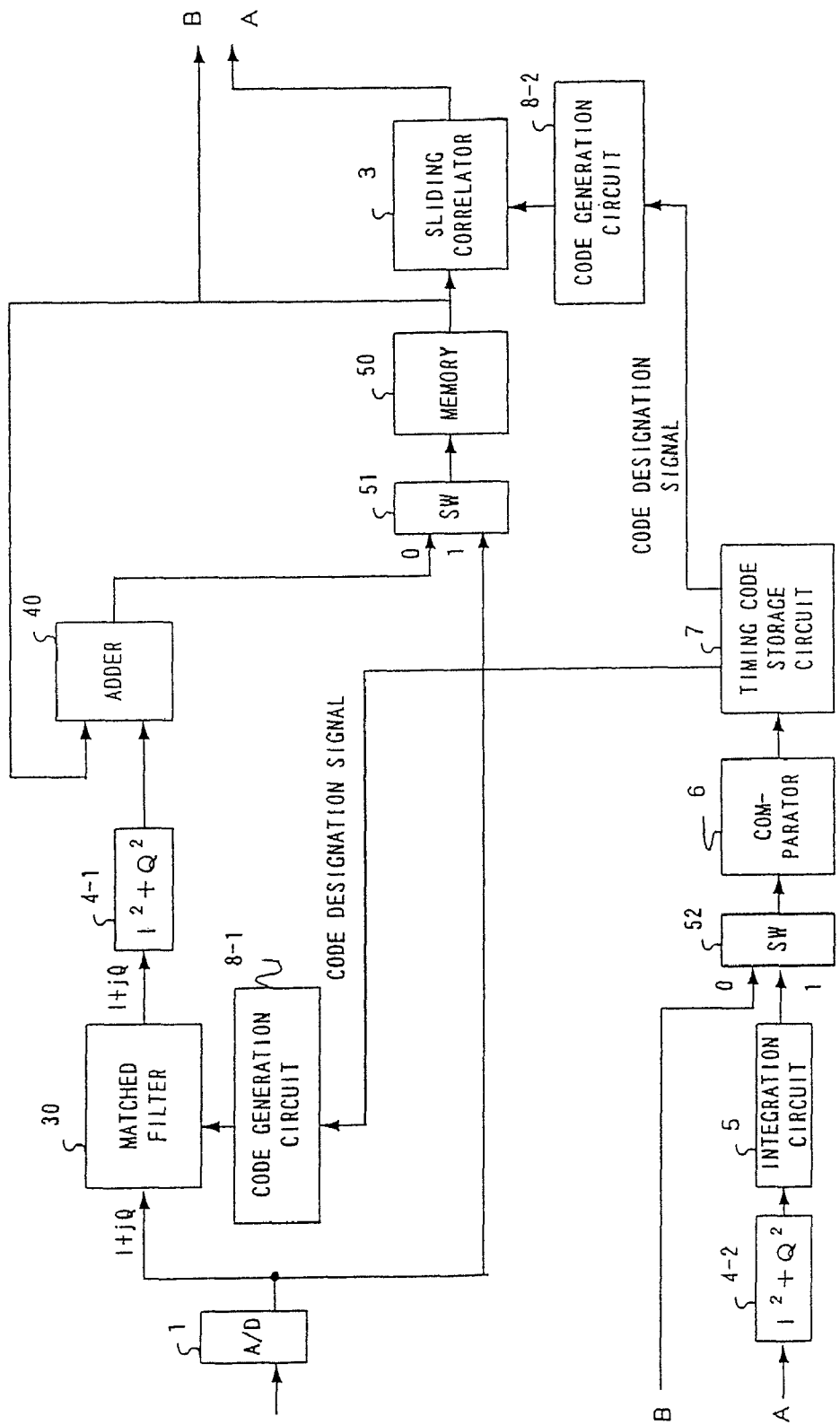
FIG. 10 is a block diagram showing a fourth embodiment of the present invention in the case where one memory is shared as a memory 2 and a memory 41.

FIG. 10 is a block diagram showing a fourth embodiment of the present invention in the case where one memory is shared as the memory 2 and the memory 41 in the third embodiment.

In the fourth embodiment where the memory 2 and the memory 41 do not need to perform operations at the same time as in the above third embodiment, the size of a circuit can be reduced by using only one memory which is shared as memory 2 and memory 41.

In FIG. 10, the same numerals as those shown in FIG. 9 indicate the same constituent elements.

The forth embodiment mainly consists of the code generation circuits 8-1 and 8-2, the matched filter 30, the sliding correlator 3, the memory 50, the comparator 6, a switch 51, a switch 52, and the timing code storage circuit 7.

The following are the operating procedures. These procedures are basically the same as those of the third embodiment.

1. When a perch channel is detected, the switch 51 selects an input 0. The switch 52 selects an input 0.

For the received complex signal, a common despreading code is detected by a matched filter 30. The signal is converted into electric power by the electric power convertor 4-1. In order to reduce the effects of noise, the memory 50 and the adder 40 are used to function as an integrator to average the values of signals at the same timing. The averaged value is stored in the memory 50 as electric power. After this process, the electric power data is sequentially read from the memory 50. As despreading timings, the comparator 6 sets m timings selected in the order of the maximum or greater correlation values, or m timings greater than a reference value. Then, these timings are stored in the timing code storage circuit.

2. When the inherent base station code is detected, the switch 51 selects an input 1. The switch 52 selects an input 1. The voltage value of a received complex signal is stored in the memory 50. After the signal is stored in the memory 50, the correlation value is detected for the m timings detected in item 1 by the sliding correlator 3 using the codes as sequential candidates.

3. The comparator 6 detects n spreading codes in the order of greater correlation outputs. The timing, code, and correlation value are stored in the timing code storage circuit 7.

The timing and code at which the maximum correlation value obtained in item 3 can be obtained are set as a despreading timing and an inherent base station code, respectively, and thus the detection of a despreading code and a despreading timing terminates.

According to the fourth embodiment, detection of the perch channel and the inherent base station code are not performed simultaneously, using the matched filter 30. Therefore, the same memory 50 is used. Consequently, the fourth embodiment can reduce the number of memories, and, as a result, reduce the size of the hardware. In addition, the present embodiment contributes to the effective use of the hardware resources by reducing the amount of time the memory 50 is not used.

In the fourth embodiment, when a perch channel is received, the inputted signal which is converted to a digital signal by the A/D converter 1 is despread by the matched filter 30. A despreading code for detecting the perch channel is generated by the code generation circuit 8-1 after receiving instructions from the timing code storage circuit 7. The obtained correlation value is converted into electric power by the electric power convertor 4-1 to thereby be inputted to the adder 40. The adder 40 adds this value to the correlation value of one previous symbol to be stored in the memory 50 through the switch 51. The added value stored in the memory 50 is inputted to the adder 40 through a feedback path to thereby be added to the correlation value of one following symbol. When correlation values are totaled for a plurality of symbols, the totaled value is applied to the input 0 of the switch 52 to thereby be inputted to the comparator 6. Then, notification of a timing of despreading is made to the timing code storage circuit 7.

When an inherent base station code is determined, a digitalized inputted signal is stored in the memory 50 through the input 1 of the switch 51. According to the procedures explained in the first embodiment, the signal stored in the memory 50 is inputted to the sliding correlator 3 to be despread by the despreading code outputted at a predetermined phase by the code generation circuit 8-2 after receiving the instructions from the timing code storage circuit 7. The correlation value of the despread signals is inputted to the electric power convertor 4-2 to thereby be converted into electric power. This electric power is integrated by the integration circuit 5 in order to improve an S/N ratio to be inputted through the switch 52 to the comparator 6. From the comparison results obtained in the comparator 6, the code and the despreading timing that a base station is using are inputted to the timing code storage circuit 7.

In each above-mentioned embodiment, in the case where a plurality of voltage-electric power convertors (electric power convertor: $1^2+Q^2$) and a plurality of code generators are described, selectors, switches and the like can work for them. The embodiments are all configured by digital circuits but they can be configured by analog circuits. To do so, the location and the number of the A/D converters can be arbitrarily selected as required.

Further, there is the possibility that a signal affected by fading is stored in a memory. In this case, if correlation values are sequentially detected downstream and all the detected correlation values do not reach a predetermined value, the stored data determine all the detected values as being abnormal values, and data to be inputted again are inputted to be stored, thereby detecting correlation values again. Consequently, a correct code detection can be performed.

Even if a despreading process is repeated by a plurality of codes, correlation values can be correctly compared and the accuracy of the detection of a despreading timing and a despreading code can be increased.

What is claimed is:

1. A mobile station corresponding to DS-CDMA performing a first correlation determination between a received signal and a pre-assigned spreading code by shifting a relative timing between the received signal and the pre-assigned spreading code, and performing a second correlation determination of the received signal for first and second spreading codes of which the code patterns are different from each other based on a timing obtained by the first correlation determination, said mobile station comprising:
    a storage unit storing the received signal; and
    a control unit using the received signal having been stored in the storage unit for performing the second correlation determination, in which the first correlation is performed by using the pre-assigned spreading code and the received signal that has not been stored in the storage unit.

* * * * *